United States Patent Office 3,271,471
Patented Sept. 6, 1966

3,271,471
DIMERIZATION PROCESS
Leonard M. Baker, Plainfield, N.J., assignor to Union Carbide Corporation, a corporation of New York
No Drawing. Filed Mar. 23, 1965, Ser. No. 442,151
12 Claims. (Cl. 260—670)

This invention relates to the preparation of the cylic dimer, di-p-xylylene. More particularly, this invention relates to improvements in the preparation of di-p-xylylene resulting in higher yields and efficiencies than heretofore obtainable.

Due to the unusually good combination of physical, electrical and thermal properties exhibited by p-xylylene polymers, much interest has been generated in attempts to produce these polymers on a commercial basis. Of the many methods heretofore proposed for producing said polymers, only one has been found to be of commercial significance. This method involves the pyrolytic polymerization of the cyclic dimer, di-p-xylylene. In general, this method comprises subliming di-p-xylylene under vacuum at 100° C. to 300° C. to vaporize the cyclic dimer, pyrolyzing the vapors at 400° to 750° C. to form p-xylylene diradicals, the reactive monomeric species, and thereafter condensing and simultaneously polymerizing the p-xylylene diradicals to form p-xylylene polymers.

The synthesis of the starting material in the polymerization process, di-p-xylylene, is complicated due to its severely strained and sterically hindered structure. Heretofore, the cyclic dimer was obtainable in only relatively small amounts. For example, Brown et al., Nature, 164, 915 (1949), isolated di-p-xylylene as a by-product in the formation of poly-p-xylylene from p-xylene in trace amounts. It has also been prepared via a Wurtz reaction with 1,2-di-p-benzyl bromide ethane in only 2.1% yield as described by Cram et al., J. Am. Chem. Soc., 93, 5691 (1951). Recently, D. F. Pollart in U.S. Patent 3,149,175 entitled "Preparation of Di-p-Xylylenes," described the preparation of di-p-xylylenes by the pyrolysis of p-xylene in yields as high as 8–10%. While this represents a significant advance in the art, still higher yields and efficiencies are necessary in order for the dimerization and polymerization process to be considered economically feasible on an over-all basis.

Accordingly, it is an object of the present invention to provide an improved process for the production of di-p-xylylene in higher yields and synergistically increased efficiencies than have heretofore been obtained.

The present invention provides an improved process for the preparation of cyclic di-p-xylylene which comprises forming a vaporous stream of reactive p-xylylene diradicals having the formula

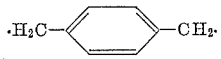

by pyrolyzing a p-xylylene diradical precursor at temperatures from about 900° C. to about 1000° C. in an oxygen-enriched environment and contacting said stream in said environment with an iron base alloy composition consisting essentially of:

| | Percent |
|---|---|
| Chromium | 20–23 |
| Nickel | 25–40 |
| Carbon | 0.05–0.15 |
| Rare earth metal | 0.001–0.3 |
| Molybdenum | 1–3 |
| Copper | Up to about 3.0 |
| Manganese | Up to about 1.0 |
| Silicon | Up to about 1.0 |
| Columbium and tantalum | Up to about 1.0 | and the remainder of said alloy being iron, condensing said vaporous stream in a fluid medium containing an inert organic solvent maintained at a temperature below about 300° C., and thereafter recovering the cyclic dimer, di-p-xylylene.

The reactive diradical, p-xylene, is generated in the process of the present invention by pyrolysis of a "p-xylylene diradical-precursor." As used herein and in the appended claims, the term "p-xylylene diradical-precursor" is intended to define an organic aromatic composition which when subjected to pyrolytic conditions, i.e., temperatures between about 900° C. and 1000° C., will form p-xylylene diradicals either directly by thermal cleavage of a hydrogen radical (H·) or indirectly through disproportionation or other similar mechanisms. Exemplary of such p-xylylene diradical precursors are p-xylene, pseudocumene, cyclic tri-p-xylylene, 1,2-di-p-tolylethane, diarylsulfones such as di-p-xylylsulfone, aryl bis-sulfones such as α,α'-bis(ethylsulfonyl)-p-xylene, and other similar compositions including derivatives of the above compositions containing ring and/or alpha substituents.

The pyrolytic reaction is conducted at a temperature of at least 900° C. and preferably from about 950° C. to about 1000° C. At temperatures above about 1000° C. some decomposition of the reactive diradical is occasioned which undesirably affects the resultant yields of products.

Low partial pressures of the p-xylylene diradical-precursors are desirable in this process, preferably such that said reactant partial pressure is between about 0.1 and 20 mm. Hg, with optimum conditions generally being secured at a partial pressure of the p-xylylene diradical-precursor of about 1 to 10 mm. Hg.

While the presence of an inert vaporous diluent in this process is not critical, it is often desirable for use in this process in order to reduce the partial pressure of the p-xylylene diradical-precursor and make it possible to operate at higher total pressures. It has been found that steam is a particularly desirable inert diluent in this process in that it permits operation at atmospheric pressure and has a protective effect in preventing decomposition of said diradical precursor, although there may also be employed other inert diluents as, for example, nitrogen, argon and like inert gases. Thus, the total pressure of the system depends on the desired operating partial pressure of the precursor, and the amount of steam and/or other diluents employed. When no diluents are employed, the pyrolysis reaction is preferably carried out at total pressures of 1 to 10 mm. Hg. Thus, in this process, it is possible to operate at total pressures even up to atmospheric pressures or higher.

The amount of steam present in this process is not narrowly critical but when employed it is preferably present in an amount of at least about 50 moles per mole of said precursor and generally between about 50 to 300 moles per mole of said precursor although between about 100 to about 200 moles per mole of precursor are most preferred. Excess steam however is not detrimental to the process.

Pyrolysis of the p-xylylene diradical-precursor is conveniently conducted by vaporizing the precursor and passing it through a high temperature thermal cracking reactor for a short period of time. Time of contact in the reaction chamber must be at least sufficient to pyrolyzed or crack a portion of the precursor into the reactive diradical, p-xylylene, but not so long that charring or complete decomposition occurs. Contact time depends to a great degree on the particular temperature selected for pyrolysis; the lower the temperature the longer the permissible contact time and vice versa. At most desirable conditions of about 975° C. contact times are preferably between about 0.03 to 0.06 second. Seldom would it be desirable to have a contact time greater than 0.1 second. At the higher operating temperatures, contact times of 0.03 second or shorter may at times be indicated.

Condensation of the p-xylylene diradicals into the di-p-xylylene is accomplished in the presence of an organic solvent. In order to stabilize the composition of the pyrolysate vapors and prevent disproportionation of diradical and initial reactant back to monoradical it is preferable to cool to about 500° C. but not below about 400° C. in order to avoid dropping below the condensation temperature of the reactive diradical before it is absorbed in the organic solvent. Cooling to below the ceiling condensation temperature in the absence of the organic solvent causes almost spontaneous polymerization of the reactive diradical to a p-xylylene polymer. This ceiling condensation temperature is generally below about 400° C. depending somewhat on the operating pressure. However, in the vaporous state, the reactive diradical is relatively stable and does not polymerize.

The cooling of the pyrolysate vapors may be accomplished in any of several convenient means. For instance, internal or external condensers, cooling coils, tubes or the like can be employed immediately after the pyrolysis zone, or if desired, natural cooling caused by long runs of air cooled tubing or piping from the pyrolysis zone to the condensing medium can be used. It is also possible to mix the organic solvent condensing medium in the vapor state in a suitable manner or mixing chamber with the pyrolysate vapors as another method. Preferably, direct cooling means, e.g., injection of a cool inert vapor into the pyrolysate vapors, are employed in order to rapidly reduces the reaction temperature thereby avoiding undesired shifts in stream composition.

It is essential in this process that the condensation of the cooled vaporous diradical be carried out in the presence of a fluid medium of an inert organic solvent. One of the most preferred solvents for reasons hereinafter discussed is p-xylene. However, if desired, other aromatic materials such as o-xylene, m-xylene, toluene, cumene, benzene, methyl-naphthalene, o-dichlorobenzene, acetic acid, 1,2-di-p-tolylethane, mineral oil, diphenylmethane, 1,2-diphenylethane, heptane, decahydronaphthalene, and the like and preferably those having an atmospheric boiling point between about 100° C. and 350° C. can be suitably employed.

The di-p-xylylene product forms on the condensation of the vaporous diradicals in the presence of the fluid medium. It is not essential however that the fluid medium be in the liquid state. While this is not desirable, the condensation can be accomplished equally as well by mixing the pyrolysate vapors with vaporous aromatic solvent and simultaneously condensing the total mixture to the liquid state for recovery of the product.

Suitable gas scrubbers or spray tanks can be used to remove and condense the p-xylylene diradicals into the di-p-xylylene in this process. Gas scrubbing devices are particularly desirable in continuous operation, and with the use of such very high boiling organic solvents as mineral oil where the di-p-xylylene can be recovered by distillation from the solvent.

When the cooled pyrolysate vapors of the reactive diradical are collected in a liquid medium, merely bubbling or dispersing the vapors below the liquid level of the aromatic solvent is also adequate to cause the p-xylylene to dimerize to the di-p-xylylene and be recovered from the solvent solution. The bath into which these vapors are condensed can be maintained at any temperature below about 300° C., and preferably from 100° to 250° C. Thus, when employed herein, the term "fluid media" is intended to cover both the liquid or gaseous state of the solvent medium in which the pyrolysate vapors are collected.

Recovery of the di-p-xylylene is relatively easy. It can, for instance, readily be recovered by removing a majority of a lower boiling solvent medium by distillation and then crystallizing the di-p-xylylene from the remaining solvent by cooling and filtering off the crystallized di-p-xylylene.

The product obtained by this process generally has a sharp melting point of 284°–285° C. and is free of other possible condensation products such as 1,2-di-p-tolylethane

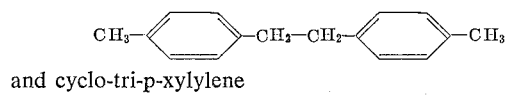

and cyclo-tri-p-xylylene

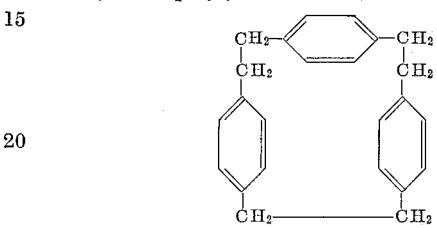

which are contained in the filtrate of this method. These can be recycled to the pyrolysis zone with additional reactant inasmuch as they are p-xylylene diradical-precursors and can be cracked back to the p-xylylene diradical in subsequent pyrolysis.

It has been found in the present invention that the yield and efficiency of production of the cyclic dimer, di-p-xylylene is synergistically enhanced when the pyrolysis as described above is conducted in an oxygen-enriched environment comprised of an iron base allow composition consisting essentially of:

| | Percent |
|---|---|
| Chromium | 20–23 |
| Nickel | 25–40 |
| Carbon | 0.05–0.15 |
| Rare earth metal | 0.001–0.3 |
| Molybdenum | 1–3 |
| Copper | Up to about 3.0 |
| Manganese | Up to about 1.0 |
| Silicon | Up to about 1.0 |
| Tantalum and columbium | Up to about 1.0 | and the remainder of said alloy being iron.

It has been found that the addition of rare earth metals such as cerium, praseodymium, neodymium, promethium, samarium, europium, galolinium, terbium, dysoprosium, holmium, erbium, thulium, ytterbium, lutetium, mixtures thereof such as that commonly known as "misch metal," and also associated elements such as lanthanum, yttrium and scandium, in active amounts not exceeding the solubility limit of the rare earth metal in the alloy composition and preferably, the rare earth metal being incorporated in said alloy in amounts of from about 0.001 to about 0.3 percent by weight results in alloys in which the metallic oxides which are formed at elevated temperatures by combination with the oxygen continually being fed to the reactor environment surprisingly act as a catalyst for the p-xylylene diradical formation resulting in synergistically increased yields and efficiencies of the cyclic dimer. No significant catalytic effect was obtained in instances where the rare earth metals were present in amounts less than about 0.001 percent. Above the solubility limit of the rare earth metals in the alloy, i.e., about 0.3 percent by weight, it was found that the resulting metallic oxides promoted decomposition of the feed stream upon contact with the hot reactor surfaces as best observed by a sharp increase in the moles of by-product gas per mole of reactant.

An environment comprised of the alloy composition can be attained through use of a packing comprised of said alloy in a high temperature reactor. When so employed, the alloy can take the form of a steel wool or woven mesh packing or any other suitable form which provides a high surface area to volume ratio. The alloy can also be present as the material used in the construction of the reaction chamber or as a liner in the reaction chamber although any means or form for providing an environment wherein the formation of the reactive p-xylylene diradicals can occur in the presence of such an alloy composition as described is contemplated as within this invention.

It has now been discovered that continuous addition of relatively small amounts of oxygen to the pyrolysis feed stream synergistically increases the chemical efficiencies of the process and increases the yield of the cyclic dimer. Oxygen in amounts of from about 0.05 to about 0.15 mole of oxygen per mole of p-xylylene diradical-precursor continually fed to the pyrolysis feed stream is considered critical in obtaining the increased yields and efficiencies described hereinabove. Oxygen in molar proportions less than about 0.05 mole oxygen per mole of precursor was found to have no appreciable effect on either yield or efficiency. Oxygen in molar proportions greater than about 0.15 mole oxygen per mole precursor was found to result in a decrease in both yield and efficiency and therefore is considered deleterious. As shown in Table I below, the molar ratio of oxygen to the p-xylylene diradical-precursor is critical in obtaining improved yields and efficiencies. The examples in Table I were obtained under substantially identical pyrolysis conditions. p-Xylene, a p-xylylene diradical-precursor, was fed in a steam diluent to a quartz pyrolysis tube packed with turnings of an alloy having the following composition:

| | Percent |
|---|---|
| Chromium | 20 |
| Nickel | 29 |
| Iron | 44 |
| Carbon | 0.07 |
| Copper | 3.0 |
| Molybdenum | 2.0 |
| Manganese | 0.75 |
| Silicon | 1.0 |
| Columbium and tantalum | 0.6 |
| Rare earth metal | 0.2 |

Oxygen was fed to the pyrolysis stream in molar ratios varying from 0.05/1 to 0.40/1 moles oxygen per mole p-xylene. The oxygen-enriched pyrolysis stream was fed to the packed reactor so that the stream contacted the packing upon its passage through the reactor. The reactive diradicals were formed in contact with the oxygenated packing and thereafter passed to a subsequent quenching zone wherein the diradicals were condensed in a fluid medium containing an inert organic solvent, in this instance, p-xylene, maintained at temperatures below about 300° C. to form di-p-xylylene.

TABLE I

| Example | Reaction Temperature (°C.) | Molar Ratio, Steam/Xylene | Molar Ratio, Oxygen/Xylene | Yield, percent Di-p-xylylene | Conversion (Percent) | Efficiency (Percent) |
|---|---|---|---|---|---|---|
| 1 | 950 | 118/1 | 0.05/1 | 11.5 | 18.2 | 63.0 |
| 2 | 950 | 118/1 | 0.10/1 | 13.5 | 21.1 | 63.8 |
| 3 | 950 | 118/1 | 0.15/1 | 9.02 | 17.3 | 52.0 |
| 4 | 950 | 118/1 | 0.20/1 | 7.20 | 18.4 | 39.2 |
| 5 | 950 | 118/1 | 0.40/1 | 6.62 | 18.2 | 36.4 |

Quite unexpectedly, it has been found in the present invention that the continuous addition of oxygen to the pyrolysis feed stream entering a pyrolysis zone packed with or constructed or lined with the iron base alloy composition hereinabove defined results in a synergistic increase in efficiency and increased yields of di-p-xylylene. Table II shown below demonstrates the improvements obtained through the present invention. The examples were obtained by pyrolyzing p-xylene as the p-xylylene diradical-precursor in a steam diluent in a quartz pyrolysis zone. Examples were obtained in the absence of both oxygen and the alloy packing as a control. Thereafter, the effect of oxygen addition alone was determined as was the individual effect of the alloy packing. Finally, the combined effect of oxygen and the alloy packing was determined and the improved yields and efficiencies clearly demonstrated.

TABLE II

| Examples | Reaction Temperature (°C.) | Molar Ratio Steam/Xylene | Molar Ratio Oxygen/Xylene | Yield, Percent di-p-xylylene (DPX) | Yield, Percent poly-p-xylylene (PPX) | Xylene Recovered (Percent) | Conversion [1] (Percent) | Efficiency [2] (Percent) |
|---|---|---|---|---|---|---|---|---|
| 6. Quartz Reactor (Control) | 950 | 118/1 | | 6.9 | 0.8 | 27.1 | 27.9 | 27.6 |
| 7. Quartz Reactor with Oxygen Addition | 950 | 118/1 | 0.1/1 | 6.5 | 1.3 | 79.0 | 21.0 | 37.1 |
| 8. Quartz Reactor with Alloy Packing [3] | 950 | 118/1 | | 11.1 | 0 | 73.8 | 26.2 | 42.3 |
| 9. Quartz Reactor with Oxygen and with Alloy Packing [3] | 950 | 118/1 | 0.1/1 | 13.5 | 0 | 79.0 | 21.1 | 63.8 |

[1] Percent conversion = 100 − percent xylene recovered.
[2] Percent efficiency = $\frac{\text{Percent (DPX and PPX)}}{100 - \text{percent xylene recovered}} \times 100$
[3] Alloy Composition: Cr, 20%; Ni, 29%; Fe, 44%; C, 0.07%; Cu, 3.0%; Mo, 2.0%; Mn, 0.75%; Si, 1.0%; Cb and Ta, 0.6%; Rare Earth Metal, 0.2%.

While not wishing to be bound by any theory or proposed mechanism, it is believed that the yields and overall efficiency of the process are increased by the present invention by minimizing the harmful side reaction of demethylation and removing the free hydrogen radicals produced in the pyrolysis by rendering them innocuous through conversion to steam in situ. For example, in the pyrolysis of p-xylene, a p-xylyl monoradical and a hydrogen radical are initially formed:

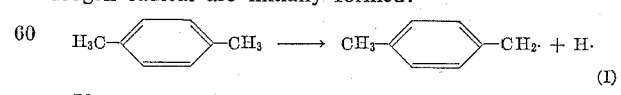

(I)

If not controlled, the hydrogen radical can react with p-xylene to cause demethylation:

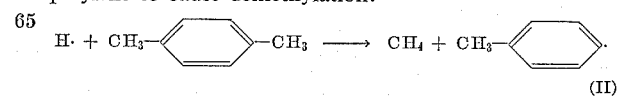

(II)

In the present invention, the quantity of oxygen feed to the reaction stream substantially corresponds to stoichiometric proportions relative to the hydrogen radicals produced. The addition of substantially stoichiometric proportions of oxygen has a decidedly beneficial effect in a pyrolysis carried out over a packing or in a zone comprised of the iron base alloy composition defined hereinabove, whereas under identical conditions in the absence of the metal surface, there is no benefit. These results as shown in Table II above, clearly demonstrate that the unique combination of the alloy environment plus the continuous feed stream of oxygen in a molar ratio of from about 0.05 to about 0.15 moles oxygen per mole of p-xylylene diradical-precursor provides a catalytic system for scavenging deleterious hydrogen radicals from the process. Removal of hydrogen radicals from the process stream in situ results in increased yields of di-p-xylylene and significantly improved chemical efficiencies. The alloy surface (M) is believed to play a significant role in bringing about the combination of hydrogen and oxygen in the following manner:

$$M + \tfrac{1}{2}O_2 \rightarrow M{-}O \qquad (III)$$
$$M{-}O + H\cdot \rightarrow M{-}O{-}H \qquad (IV)$$
$$M{-}O{-}H + H\cdot \rightarrow M + H_2O \qquad (V)$$

The results in the quartz pyrolysis tube alone (Example 6) and the quartz pyrolysis tube with an oxygen stream (Example 7) indicate that the direct combination of hydrogen and oxygen does not occur to any appreciable extent in the absence of the alloy environment.

In the preferred method of operating this process, p-xylene and steam are fed to an atmospheric pressure reactor packed with a mesh of the alloy composition above defined. Oxygen, in molar ratios of from about 0.05 to 0.15 mole oxygen per mole p-xylene and more preferably 0.05 to 0.10 mole oxygen per mole p-xylene, is fed to the pyrolysis stream most conveniently in the form of an air bleed. The temperature in the reactor is maintained between about 900° C. to 1000° C. and most preferably in the range of about 950° C. to about 975° C. The p-xylene and steam flow rates are adjusted so as to give a contact time of about 0.03 to 0.6 second and a p-xylene partial pressure of 1.0 to 10 mm. Hg. The pyrolysate vapors are cooled at the outlet of the pyrolysis zone to a temperature of about 400–700° C. and then passed into a quenching bath of boiling organic solvent where the condensation of the diradical to the cyclic dimer takes place.

The remaining uncondensed vapors are subsequently condensed. The aqueous layer is decanted. The condensed p-xylene is recycled. The solution containing the dimer is concentrated by flashing or reduced pressure distillation to about one-tenth its original volume. On cooling the di-p-xylylene crystallizes from the p-xylene solution in high purity and is separated from the mother liquor by filtration or by centrifugation, washed and dried.

It is, of course, realized that the dimer recovery process can be conducted either batch-wise or continuously. The use of p-xylene as the condensation medium is highly desirable in the continuous system inasmuch as it can be recycled within the system serving not only as the reactant but also as the condensation medium and problems of handling a separate solvent are avoided.

What is claimed is:

1. Process for the preparation of cyclic di-p-xylylene which comprises forming reactive p-xylylene diradicals having the structural formula:

by pyrolyzing a stream comprised of a p-xylylene diradical precursor at temperatures from about 900° C. to about 1000° C. in an oxygen enriched environment and contacting said stream in said environment with an iron base alloy composition consisting essentially of:

| | Percent |
|---|---|
| Chromium | 20–23 |
| Nickel | 25–40 |
| Carbon | 0.02–0.15 |
| Rare earth metal | 0.001–0.3 |
| Molybdenum | 1–3 |
| Copper | Up to about 3.0 |
| Manganese | Up to about 1.0 |
| Silicon | Up to about 1.0 |
| Columbium and tantalum | Up to about 1.0 | and the remainder of said alloy being iron, condensing the reactive diradicals so formed in a fluid medium containing an inert organic solvent maintained at a temperature below about 300° C., and thereafter recovering the cyclic di-p-xylylene.

2. Process as defined in claim 1 wherein oxygen is continuously fed to the stream containing the p-xylylene diradical precursor in substantially stoichiometric proportions based on the concentration of hydrogen radicals formed by pyrolyzing said p-xylylene diradical precursor.

3. Process for the preparation of cyclic di-p-xylylene which comprises forming reactive p-xylylene diradicals having the structural formula:

by feeding a stream comprised of a p-xylylene diradical percursor and from about 0.05 to about 0.15 mole of oxygen per mole of said precursor to a pyrolyzing environment maintained at temperatures from about 900° C. to about 1000° C., contacting said stream in said environment with an iron base alloy composition consisting essentially of:

| | Percent |
|---|---|
| Chromium | 20–23 |
| Nickel | 25–40 |
| Carbon | 0.02–0.15 |
| Rare earth metal | 0.001–0.3 |
| Molybdenum | 1–3 |
| Copper | Up to about 3.0 |
| Manganese | Up to about 1.0 |
| Silicon | Up to about 1.0 |
| Columbium and tantalum | Up to about 1.0 | and the remainder of said alloy being iron, condensing the reactive diradicals so formed in a fluid medium containing an inert organic solvent maintained at a temperature below about 300° C., and thereafter recovering the cyclic di-p-xylylene.

4. Process as defined in claim 3 wherein the oxygen in said stream is present in a molar ratio of from about 0.05 to about 0.10 mole oxygen per mole of said precursor.

5. Process as defined in claim 3 wherein the stream additionally contains an inert vaporous diluent.

6. Process for the preparation of cyclic di-p-xylylene which comprises forming reactive p-xylylene diradicals having the structural formula:

by feeding a stream comprised of p-xylylene and from about 0.05 to about 0.15 mole of oxygen per mole of p-xylylene to a pyrolysis zone maintained at temperatures from about 900° C. to about 1000° C., contacting said stream in said zone with an iron base alloy composition consisting essentially of:

| | Percent |
|---|---|
| Chromium | 20–23 |
| Nickel | 25–40 |
| Carbon | 0.02–0.15 |
| Rare earth metal | 0.001–0.3 |
| Molybdenum | 1–3 |
| Copper | Up to about 3.0 |
| Manganese | Up to about 1.0 |
| Silicon | Up to about 1.0 |
| Columbium and tantalum | Up to about 1.0 | and the remainder of said alloy being iron, condensing the reactive diradicals so formed in a fluid medium containing an inert organic solvent maintained at a temperature below about 300° C., and thereafter recovering the cyclic di-p-xylylene.

7. Process as defined in claim 6 wherein the partial pressure of the p-xylene is from about 0.1 to about 20 mm. Hg.

8. Process as defined in claim 6 wherein the stream additionally contains an inert vaporous diluent.

9. Process for the preparation of cyclic di-p-xylylene which comprises forming reactive p-xylylene diradicals having the structural formula:

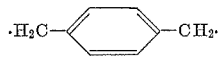

by feeding a stream comprised of p-xylene in an inert steam diluent and from about 0.05 to about 0.15 mole oxygen per mole of p-xylene to a pyrolysis zone maintained at temperatures from about 900° C. to about 1000° C., contacting said stream in said zone with an iron base alloy composition consisting essentially of:

| | Percent |
|---|---|
| Chromium | 20–23 |
| Nickel | 25–40 |
| Carbon | 0.05–0.15 |
| Rare earth metal | 0.001–0.3 |
| Molybdenum | 1–3 |
| Copper | Up to about 3.0 |
| Manganese | Up to about 1.0 |
| Silicon | Up to about 1.0 |
| Columbium and tantalum | Up to about 1.0 | and the remainder of said alloy being iron, condensing the reactive diradicals so formed in a fluid medium containing an inert organic solvent maintained at a temperature below about 300° C., and thereafter recovering the cyclic di-p-xylylene.

10. Process as defined in claim 9 wherein the inert steam diluent is present in amounts of from about 50 to about 300 moles of steam per mole of p-xylene.

11. Process as defined in claim 9 wherein the pyrolysis zone is comprised of said iron base alloy composition.

12. Process as defined in claim 9 wherein the pyrolysis zone contains said iron base alloy composition therein as a high surface area to volume packing.

References Cited by the Examiner

UNITED STATES PATENTS 2,719,131  9/1955  Hall _____ 260—670
3,149,175  9/1964  Pollart _____ 260—670

DELBERT E. GANTZ, *Primary Examiner.*

G. E. SCHMITKONS, *Assistant Examiner.*